United States Patent
Cockshott et al.

[11] Patent Number: 6,049,632
[45] Date of Patent: Apr. 11, 2000

[54] DATA COMPRESSION

[75] Inventors: Paul William Cockshott; Douglas Robert McGregor; Richard John Fryer, all of Strathclyde; Robert Bartholemew Lambert, Renfrewshire, all of United Kingdom

[73] Assignee: University of Strathclyde, Glasgow, United Kingdom

[21] Appl. No.: 09/066,480

[22] PCT Filed: Oct. 22, 1996

[86] PCT No.: PCT/GB96/02593

§ 371 Date: Jun. 18, 1998

§ 102(e) Date: Jun. 18, 1998

[87] PCT Pub. No.: WO97/16026

PCT Pub. Date: May 1, 1997

[30] Foreign Application Priority Data

Oct. 27, 1995 [GB] United Kingdom .................. 9522077

[51] Int. Cl.[7] ...................................... G06K 9/36
[52] U.S. Cl. .......................................... 382/239
[58] Field of Search .................... 382/232, 236, 382/238, 239, 240, 248, 250; 358/432, 433; 348/384, 394, 395, 400–416, 425, 430, 431, 699

[56] References Cited

U.S. PATENT DOCUMENTS

| | | | |
|---|---|---|---|
| 4,764,975 | 8/1988 | Inoue ...................................... | 382/232 |
| 4,788,598 | 11/1988 | Ochi et al. .............................. | 382/232 |
| 4,797,741 | 1/1989 | Sato et al. ............................... | 382/232 |
| 5,416,606 | 5/1995 | Katayama et al. ...................... | 382/232 |
| 5,457,495 | 10/1995 | Hartung . | |
| 5,732,157 | 3/1998 | Osawa ..................................... | 382/232 |
| 5,742,704 | 4/1998 | Suzuki et al. ........................... | 382/232 |

FOREIGN PATENT DOCUMENTS

| | | |
|---|---|---|
| 0 280 314 | 8/1988 | European Pat. Off. . |
| 0 346 635 | 12/1989 | European Pat. Off. . |
| 0 368 139 | 5/1990 | European Pat. Off. . |

OTHER PUBLICATIONS

"Improved Hierarchical Vector Quantization For Image Compression", Ping Yu et al, pp. 92–95.

"Computation Bounded Vide Coding", Brofferio et al, pp. 199–205.

Primary Examiner—Jose L. Couso
Attorney, Agent, or Firm—Alston&Bird LLP

[57] ABSTRACT

A method of compressing an image frame composed of an array of pixels in the form of digital electrical signals, the method comprising the steps of: (a) providing a reference image as a first approximation to the original image to be compressed; (b) dividing the original image into patches of one or more sizes; (c) for each patch determining a compressed encoding of the data contained therein where the compressed encoding can be uncompressed to provide an approximation to the patch; (d) selecting that one of the compressed encodings which, when uncompressed and added to the reference image, gives the biggest improvement therein relative to the original image; (e) adding the selected compressed encoding in uncompressed form to the reference image and in compressed form to a compressed representation of the original image; and (f) recursively repeating step (d) for the remaining compressed encodings until either a desired quality level of the reference image or a maximum data size of the compressed representation is achieved.

15 Claims, 1 Drawing Sheet

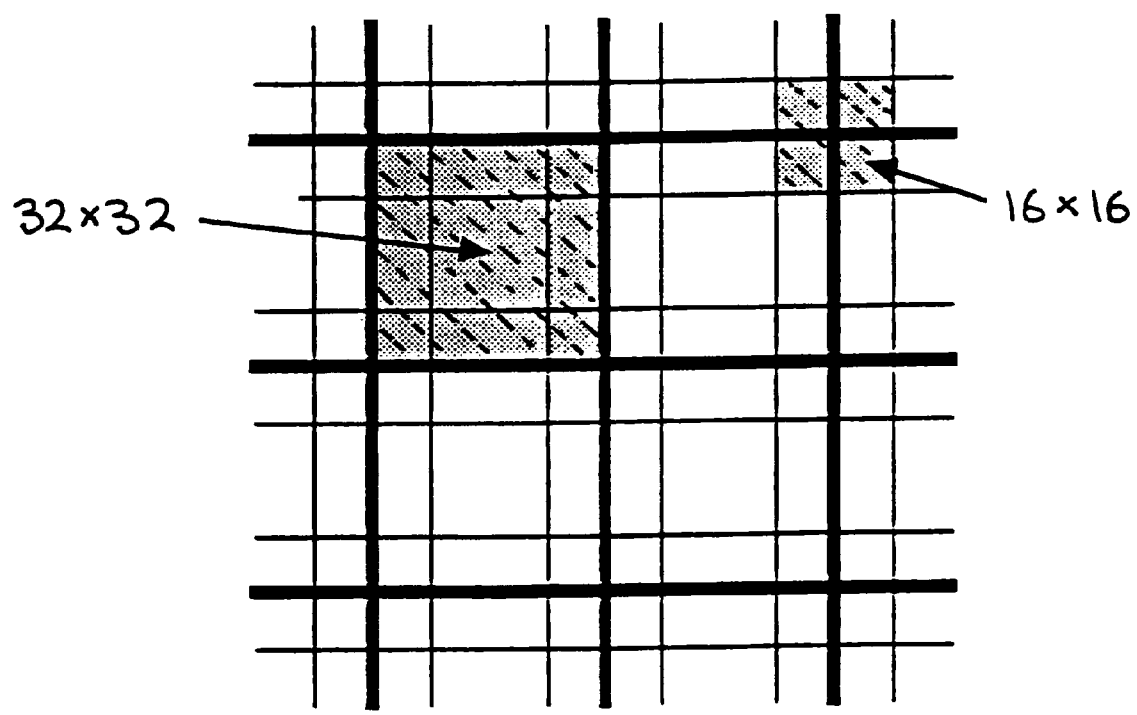

DATA COMPRESSION

The present invention relates to a method and apparatus for compressing arrays of data in the form of digital electrical signals and is applicable in particular, though not necessarily, to the compression of digitally encoded image sequences.

There have recently been proposed a number of techniques for compressing arrays of data and in particular two dimensional images which may for example be individual images or frames of a video sequence. Some of the image compression techniques employ what is known as "vector quantisation" where a codebook of reference patches (e.g. relatively small portions taken from one or more "library" images) is constructed. An image to be compressed is partitioned into a number of image patches and a matching (i.e. similar) reference patch selected for each image patch from the codebook. The codebook index for each chosen reference patch in the codebook is stored, together with the corresponding position vectors of the image patches (i.e. their position in the original image), to provide a compressed representation of the image. This coding for each patch is referred to as a 'compressed encoding'. Providing that a copy of the codebook is available, an approximation to the original image can be constructed by using the stored codebook indices to recover the required set of reference patches and inserting these into an image frame using the respective stored image patch position vectors. The achievable degree of compression is a function of the size of the image patches into which the image is partitioned, larger patches allowing higher compression.

It is recognised that for most images, certain areas of an image will contain more detail than other areas and that, if the patches into which the image is divided are of a size intended to achieve high compression, the detailed areas of the image may not be adequately represented in the compressed representation. It has therefore been proposed that areas of an image containing significant detail should be represented by relatively small patches whilst areas containing relatively little or no detail should be represented by larger patches. This process involves temporarily reconstructing an image using the first level large patches identified from the codebook. This provides a reference image which can be improved in a stepwise manner. It will be appreciated that this temporary image represents a decompressed version of the 'compressed' image. In order to identify areas of detail which require representation by smaller patches, after each new large reference patch is added to the compressed image, the corresponding temporary image is compared against the original image to identify the region of the original image which maximally differs from the temporary image. The image patch containing this region is then sub-divided into smaller image patches and reference patches are identified from the codebook for these newly created image patches. Codebook indices and position vectors for the identified reference patches are then added to the compressed representation. The process is recursively repeated until either the temporary image reaches a desired quality level or the data size of the compressed representation reaches some maximum threshold level.

A problem with this maximum difference approach is that because the codebook is necessarily of a finite size, in certain circumstances it may be extremely difficult to find a close match for certain regions of an image. A considerable amount of processing time, and storage space in the compressed image, may be devoted to representing regions of the original image which, although identified as being poorly represented by the compressed image, can never be satisfactorily represented due to the limitations of the codebook.

It is an object of the present invention to overcome or mitigate at least one of the disadvantages of such known data compression processes.

It is another object of the invention to provide a data compression method and apparatus which optimises the quality of the compressed data According to a first aspect of the present invention there is provided a method of compressing an array of data entries in the form of digital electrical signals, the method comprising the steps of:

(a) providing a reference data array as a first approximation to the original data array to be compressed;

(b) dividing the original data array into blocks of one or more sizes;

(c) for each data block, determining a compressed encoding of the data contained therein where the compressed encoding can be uncompressed to provide an approximation to the data block;

(d) selecting that one of the compressed encodings which, when uncompressed and added to the reference data array, gives the biggest improvement therein relative to the original data array;

(e) adding the selected compressed encoding in uncompressed form to the reference data array and in compressed form to a compressed representation of the original data array; and (f) recursively repeating step (d) for the remaining compressed encodings until either a desired quality level of the reference data array or a maximum data size of the compressed representation is achieved.

The present invention 'concentrates' on improving those areas of the reference data array for which improvement is both possible and most advantageous. This contrasts with known compression processes which often concentrate on areas for which improvement is not possible or can only be achieved to a marginal extent.

The step (c) of determining a compressed encoding of each data block may comprise searching a codebook of reference data blocks, where each reference block is assigned a unique codebook index, to find the closest matching reference block. Alternatively, this step may involve determining some other appropriate representation such as a discrete cosine transform (DCT) or discrete fourier transform (DFT) for each blocks.

The compressed encoding selected in step (d) which, when in uncompressed form, results in the greatest improvement in the reference data array, and selected in step (d), may be identified by: firstly determining the error $\epsilon_1$, between each of said data blocks and the respective compressed encodings in uncompressed form; determining the error $\epsilon_2$, between each of said data blocks and the respective blocks of the reference data array; and selecting that compressed representation which maximises $\epsilon_1-\epsilon_2$. In one example, the errors $\epsilon_1-\epsilon_2$ may be evaluated as the total squared difference between respective entries of the compared data blocks.

Whilst the invention can be applied to the compression of any digital data, for example representing audio signals or 3D pressure variations within the atmosphere, it is particularly applicable to the compression of two dimensional images which comprise an array of pixels, each having a pixel intensity value or values. Typically, the data blocks comprise patches of adjacent pixels. Whilst the patches may be created by uniformly dividing the image on a single level, as an alternative, the image may be arbitrarily divided on two or more levels to create several sets of overlapping and/or differently sized or shaped patches. Indeed, the creation of overlapping patches may be particularly advantageous as it reduces or eliminates edge artifacts which can otherwise give a "tiled" effect to a decompressed image. The compressed representations or reference patches derived for overlapping patches are combined in the reference image using a predetermined criterion. For example, the overlapping regions may be derived from a weighted combination of the overlapping pixel intensities. Alternatively, a rule may be provided for choosing which pixels to choose from which patch, so that the pixels can be combined in a non-overlapping manner.

Where an image is sub-divided into differently sized patches on two or more levels, it is possible that a reference patch may be selected for addition to the reference image which patch completely or partially occludes a previously selected patch. Where the occlusion is complete, the previously selected patch may be removed from the reference image. However, where the occlusion is partial, it may be appropriate to determine if the partially occluded patch should be replaced with an alternative patch (or transformed in some way) to better approximate that portion which is not occluded. Alternatively, the partially occluded patch may be completely removed from the reference image, when by so doing the quality of the image may be improved or the reduction in quality is more than compensated for by an increase in quality obtained by insertion into the reference image of some reference patch in another region of the image frame.

This application of the invention can be extended to the compression and transmission of video pictures (e.g. using CD or video tape media) and more particularly to the compression and transmission of video pictures between videophones. In an embodiment of the invention, the reference data array provided at step (a) is an arbitrary image such as a uniformly black image. The reference image is stored in a memory of the transmitting videophone and a memory of the receiving videophone. Compressed encodings of image patches obtained from the first image frame to be captured by the phone's camera are added recursively to a buffer memory and simultaneously in uncompressed form to the reference image in the transmitting phone's memory until a predetermined amount of data is held in the buffer memory. The data stored in the buffer is then transmitted to the receiving videophone.

At some time interval (the video camera 'refresh rate' or a multiple thereof) after capturing the first image frame, the transmitting videophone will capture a second image frame. If this time interval is relatively short, e.g. 0.1 seconds, it is likely that this subsequent image frame will be similar to the first frame and that only marginal changes will therefore be required to update the display at the receiving videophone. It would be extremely inefficient to completely discard the image data already transmitted to the receiving videophone, and start the compression process again. Rather, the initial reference image frame modified during compression of the first image frame by repeated application of step (d) can form a new reference image frame for the second image frame. Following execution of steps (b) and (c), the repeated application of step (d) identifies those compressed encodings which in uncompressed form reduce the error between the new reference image frame and the second image frame. These compressed encodings are stored in the buffer memory until the required data level is achieved whereupon they are transmitted to the receiving videophone to update the image frame displayed thereon. It will be appreciated that those areas of the captured image frame which have changed will be most susceptible to improvement and that the compressed encodings identified in step (d) will tend to correspond to those areas.

In the case where the compressed encodings are obtained by searching a codebook of reference patches, the codebook can be constructed using any one of a number of known techniques. The codebook preferably comprises a number of sets of differently sized patches. For example, the codebook may comprise a set of large patches (e.g. 64 by 64 pixels), a set of intermediate patches (e.g. 16 by 16 pixels), and a set of small patches (e.g. 8 by 8 pixels) to match similarly sized patches into which the image to be compressed is divided.

In order to improve the quality of the compressed representation, identification of matching patches from the codebook may involve transforming the reference patches or the image patches using, for example, rotation or reflection. The transformation required to improve the match will be stored with the image patch position vectors and the codebook indices as part of the compressed representation. Similarly, the image and reference patches may be normalised for brightness and contrast with the resulting normalising constants forming part of the compressed representation.

Where the image to be compressed is one of a sequence of video image frames, and where scene components are in motion between subsequent frames, it may be that a good approximation to an image patch containing the moving component or a portion thereof may be obtained by extracting a patch from an adjacent portion of the compressed representation (in uncompressed form) of the preceding frame. The compression method may therefore comprise temporarily adding patches extracted from the compressed representation of the preceding frame to the codebook, or to a supplementary codebook, prior to conducting a search of the codebook(s). In order to reduce the search time, the search may be restricted to patches extracted from areas of the compressed representation of the preceding frame which are adjacent to the image patch for which the search is being conducted.

It will be appreciated that an object, e.g. a person, moving about in front of a stationary, or near stationary, background, may be continually covering and uncovering portions of the background. It may thus be appropriate to store in the supplementary codebook patches obtained from a number of frames directly preceding the frame to be compressed. This principle can be extended further, such that a codebook is created for an auxiliary image prior to commencing a videophone 'conversation'. This auxiliary image would typically be the background in front of which the caller is to be situated. Of course, multiple auxiliary images can be used if appropriate.

A further development is to flag patches taken from the auxiliary image(s) so that they ran be recognised as such by the receiving videophone. This flag could allow the decompression algorithm to divert the codebook look-up operation to a 'substitute' background codebook allowing the caller to appear in front of some alternative background, e.g. a palm fringed beach rather than the boardroom wall in front of which he or she is actually situated.

According to a second aspect of the present invention there is provided apparatus for compressing an array of data entries in the form of digital electrical signals, the apparatus comprising a digital computer, for example of known type, set up to run a program embodying the method set out according to the above first aspect.

For a better understanding of the present invention and in order to show how the same may be carried into effect, an embodiment of the invention will be described by way of example with reference to the accompanying drawing which shows a division of part of an image frame to be compressed into multi-layer image patches.

Consider firstly a two dimensional image frame composed of a regular array of pixels, each of which has associated therewith a pixel intensity. The first stage in the compression process is to create a codebook by extracting reference patches from one or more library image frames. These library image frames preferably contain features which are likely to be contained in the image frame to be compressed. A typical codebook would contain several hundred reference patches of different sizes, e.g. a set of 32×32 pixel patches, a set of 16×16 pixel patches, and a set of 8×8 pixel patches, each of the patches being identified by a unique codebook index. Each of the reference patches are normalised for brightness by determining the average intensity of the pixels within the patch and subtracting that average value from the intensity value for each pixel. Similarly, the patches are normalised for contrast by dividing the intensity value of each pixel within a patch by the maximum absolute intensity value within that patch following normalisation for brightness. Thus, the pixel intensity value for each patch will lie between −1 and +1.

An image frame to he compressed is sub-divided into an array of contiguous data blocks or image patches (each of which has a unique position vector) at a first level. For an image comprising 512×512 pixels, these patches will be of size 32×32 pixels so that the image frame is divided into 256 large image patches. The image is then subdivided a further two times, at different levels, to provide a set of 16×16 pixel patches and a set of 8×8 pixel patches. The sub-division is such that the 8×8 patches overlap the edges of the 16×16 patches and the 16×16 patches overlap the 32×32 patches. This overlapping arrangement is illustrated in the accompanying drawing although one of the levels of sub-division is omitted for the sake of clarity. Each image patch is assigned a position vector, which may conveniently be the position in the image of the centre of the patch.

All of the image patches are normalised for both brightness and contrast as described above so that the pixel intensities lie between −1 and +1. For each normalised image patch, the correspondingly sized entries in the codebook are searched to identify that one which most closely resembles the image patch. For a black and white image, the search may be carried out by comparing each pixel of the selected image patch with the corresponding pixel of each reference patch, using for example a mean squared difference approach (for colour images the intensities for each of the colours is compared). Alternatively, and in order to minimise the amount of computation required, some "global" characteristic or characteristics may be calculated for each of the reference and image patches and the search conducted by comparing these global characteristics. One example of this type of search strategy is described in WO95/20296.

The codebook index of each of the matched reference patches is stored, together with the position vector and the brightness and contrast normalisation factors for the matched image patch, as a compressed encoding. For each codebook reference patch and image patch pair matched together, the error between the two patches is evaluated to provide a set of errors $\epsilon_1$. One suitable measure of error is the total squared difference between the respective pixel arrays. This requires the intensities of the corresponding pixels to be subtracted from one another, and the resulting differences-squared and summed.

The compression method involves the provision of some arbitrary reference image frame which can be taken as a first, albeit extremely poor, approximation to the image frame to be compressed. The above error computation operation is carried out for the image patches and respective correspondingly sized areas extracted from the reference image frame so that a set of actual errors $\epsilon_1$ between the reference image frame and the frame to be compressed are obtained. This set of errors is then compared with the set of errors obtained for the reference patches.

From the comparison, that codebook reference patch which would lead to the greatest reduction in error, i.e. the greatest improvement in image quality, if added to the reference image, is identified. The corresponding compressed encoding is stored in a compressed image representation. In addition, the reference image is updated by adding the selected reference patch thereto.

This process is recursively repeated so that reference patches are continually added to the reference image frame leading to a stepwise improvement in the quality of the reference image frame. In parallel, the compressed encodings are added to the compressed representation. It is noted that use of the total squared error to measure improvement will tend to add larger reference patches prior to smaller ones, although this will not always be the case. Typically the recursion will continue until the quality of the reference image frame reaches some acceptable threshold level, for example by ensuring that the error between the reference image frame and the original image frame at any one point does not exceed a threshold level. Alternatively, the process may continue until the amount of data contained in the compressed image representation reaches some threshold level.

It is envisaged that the image compression method described above could be used to compress 'still' two dimensional image frames or to compress a set of image frames forming a video sequence. One application to which the method is particularly applicable is that of the transmission of video images between videophones. Whilst the concept of videophones has been around for a number of years, the commercial success of videophones has been limited in practice by the poor quality of the images displayed on the videophones. This poor quality results from the low signal bandwidth available over the transmission channels combined with inappropriate qualities, delays and frame rates available with current compression technique.

An improvement to existing transmission systems would be to compress each frame to be transmitted using the compression method detailed above. However, an even greater improvement can be achieved by recognising that the changes between successive images of the video sequence are likely to be extremely small. Typically, the background to the videophone operator will remain stationary whilst the operators head and facial features may vary to some small extent between frames.

The above method is applied to videophone signal transmission as follows. The first frame captured by the transmitting videophone is compressed as described above using some initial arbitrary reference image frame which is stored in memory. The same reference image frame is also stored in a buffer memory of the receiving videophone. A set of compressed encodings are obtained as described above and are stored in buffer memory up to a preset data limit, determined by the signal bandwidth of the transmission channel and desired frame rate of the image sequence. This data is then transmitted from the buffer memory to the receiving videophone where it is decoded and added to the reference image frame for display. The data is also added to the reference image stored in the transmitting videophone's memory.

Whilst the transmitting videophone is compressing the first captured image frame, its camera captures a second image frame. Following transmission of the first set of patch data, the compression process is repeated but this time looks for patches which will give the best improvement of the 'new' reference image relative to the second captured image frame. The compressed encodings of these patches are again stored in the buffer memory prior to transmission to the receiving videophone. The process is repeated for each newly captured frame such that the reference image frame continually tracks changes in the captured image frames.

It will be appreciated that modifications to the above described embodiments may be made without departing from the scope of the present invention.

One such modification which may be made to the videophone implementation involves extracting patches at one or more levels from each reference image frame and adding these patches temporarily to a supplementary codebook which is updated after transmission of each image update. This process would be conducted at both ends of the transmission line. If motion of scene components occurs between frames of a sequence, it is likely that the reference patch which best improves the current reference frame will be a patch extracted from an adjacent region of the preceding image frame and these will therefore be taken from the supplementary codebook. The entries of the supplementary codebook searched for a given image patch may be restricted to those entries taken from regions of the reference image adjacent to the image patch for which the search is being conducted.

A further modification involves extracting reference patches from an auxiliary image and adding these to the codebook or to a supplementary codebook. Such an auxiliary image may be captured when the videophone is first turned on and the phone caller is not yet positioned in front of the viewed background. These additional reference patches will be transmitted to the receiving videophone prior to commencing the phone conversation. It will be appreciated that during a conversation, movement of the caller will continually cover and uncover areas of the background and that the compression algorithm will be able to find high quality matching reference patches, from the auxiliary image, for areas subsequently uncovered. The auxiliary image may be updated during the conversation, e.g. where 'new' stationary objects are added. By marking reference patches with a flag, it is possible to substitute the actual background for a substitute background at the receiving videophone. Detection of motion in the background may also be used to compensate the captured frames for camera jitter.

What is claimed is:

1. A method of compressing an array of data entries in the form of digital electrical signals, the method comprising the steps of:
    (a) providing a reference data array as a first approximation to the original data array to be compressed;
    (b) dividing the original data array into a plurality of blocks of one or more sizes;
    (c) for each data block determining according to a predetermined encoding process a compressed encoding of the data contained therein, where the compressed encoding can be uncompressed to provide an approximation to the data block;
    (d) selecting from the plurality of compressed encodings that one of the compressed encodings which, when uncompressed and added to the reference data array, gives the biggest improvement in the reference data array relative to the original data array;
    (e) adding the selected compressed encoding in uncompressed form to the reference data array to thereby provide a second approximation to the original data array, and storing the selected compressed encoding in compressed form to establish a compressed representation of the original data array; and
    (f) recursively repeating steps (d) and (e) for the remaining compressed encodings successively to select further compressed encodings to provide reference data arrays which are successive approximations to the original data array and to add to the compressed representations of the original data array, until either a desired quality level of the reference data array is achieved or a maximum data size of the compressed representation is achieved.

2. A method according to claim 1, wherein the predetermined encoding process of step (c) comprises searching a codebook of reference data blocks to find the closest matching codebook reference block, each codebook reference data block having a unique index assigned thereto, the compressed encoding comprising the index of the identified codebook reference data block.

3. A method according to claim 1, wherein the predetermined encoding process of step (c) comprises determining a discrete cosine transform (DCT) or discrete fourier transform (DFT) for each data block, the compressed encoding comprising the determined transform.

4. A method according to claim 1, wherein the selected compressed encoding which results in the greatest improvement in the reference data array is identified by: determining the error between each of said data blocks and the respective compressed encodings in uncompressed form to provide an error set $\epsilon_1$; determining the error between each of said data blocks and the respective corresponding blocks of the reference data array to provide an error set $\epsilon_2$; comparing corresponding entries of the error sets $\epsilon_1$, $\epsilon_2$ and selecting that compressed encoding which maximises the difference value between such corresponding entries.

5. A method according to claim 4, wherein the error of each of the error sets, $\epsilon_1$, $\epsilon_2$ is the total squared difference between respective entries of the compared data blocks.

6. A method of compressing a two dimensional image which comprises an array of pixels, each having a pixel intensity value or values, using the method of claim 1.

7. A method according to claim 6, wherein the data blocks comprise patches of contiguous pixels.

8. A method according to claim 7, wherein the image is divided on two or more levels to create several sets of overlapping and/or differently sized or shaped patches and where the compressed encodings derived for overlapping patches are combined in uncompressed form in the reference image using a predetermined criterion.

9. A method of transmitting video pictures between a pair of videophones using the method of claim 6.

10. A method according to claim 9, wherein the reference data array which forms said first approximation is an arbitrary image which is stored in a memory of the transmitting videophone and in a memory of the receiving videophone, the method comprising the steps of:
    (1) carrying out steps (a) to (e) for a first image frame captured by the transmitting videophone, wherein said compressed representation is stored in a buffer memory of the transmitting videophone;

(2) transmitting the compressed representation to the receiving videophone;

(3) carrying out steps (a) to (e) for a second image frame captured by the transmitting videophone, where the modified reference image obtained in step (1) as a second approximation to the original data array provides the reference image for step 3(a);

(4) transmitting the resulting compressed representation to the receiving videophone; and (5) repeating steps (3) and (4) for the third and subsequently obtained image frames captured by the transmitting videophone.

11. A method according to claim 10, comprising the steps of:

receiving and decompressing the first transmitted compressed representation at the receiving videophone;

displaying the decompressed representation and storing it as a reference image in a memory of the receiving videophone; and updating the reference image with each subsequently received compressed representation and storing and displaying the result.

12. A method according to claim 10 when appended to claim 2 and comprising temporarily adding patches extracted from the final reference image obtained for each frame to the codebook, or to a supplementary codebook, prior to conducting a search of the codebook(s) for each succeeding frame.

13. A method according to claim 12, wherein the codebook search is restricted to patches extracted from areas of the reference image of a preceding frame which are adjacent to the image patch for which a search is being conducted.

14. A method according to claim 12, comprising storing in the codebook patches obtained from a plurality of frames directly preceding the frame to be compressed.

15. Apparatus for compressing an array of data entries in the form of digital electrical signals, the apparatus comprising a digital computer, for example of known type, set up to run a program embodying the method of claim 1.

* * * * *